United States Patent [19]

Cooke

[11] Patent Number: 4,554,116
[45] Date of Patent: Nov. 19, 1985

[54] OPTICAL CABLE ELEMENT MANUFACTURE

[75] Inventor: Edward I. Cooke, Addington, England

[73] Assignee: BICC Public Limited Company, London, England

[21] Appl. No.: 574,360

[22] Filed: Jan. 27, 1984

Related U.S. Application Data

[63] Continuation of Ser. No. 307,072, Sep. 30, 1981, abandoned.

[30] Foreign Application Priority Data

Oct. 1, 1980 [GB] United Kingdom ............... 8031693

[51] Int. Cl.$^4$ .................................................. G02B 5/14
[52] U.S. Cl. .................................. 264/1.5; 264/134; 264/174; 264/288.8; 425/66; 425/111; 425/113; 425/392; 425/404
[58] Field of Search .................. 264/1.5, 1.6, 174, 134, 264/135, 288.8; 156/48; 350/96.22, 96.32, 96.34; 425/66, 111, 113, 392, 404

[56] References Cited

U.S. PATENT DOCUMENTS

| | | | |
|---|---|---|---|
| 3,229,012 | 1/1966 | Garner | 264/174 |
| 3,556,635 | 1/1971 | Schrenk et al. | 350/96 |
| 3,567,846 | 3/1971 | Brorein et al. | 174/102 |
| 3,692,447 | 9/1972 | Nelson | 425/113 |
| 3,733,225 | 5/1973 | Moody | 156/48 |
| 3,810,784 | 5/1974 | Wong et al. | |
| 3,889,455 | 6/1975 | Portinari et al. | 57/7 |
| 4,147,407 | 4/1979 | Eichenbaum et al. | 350/96 |
| 4,154,783 | 5/1979 | Jackson | 264/1 |
| 4,230,395 | 10/1980 | Dean et al. | 350/96 |
| 4,259,540 | 3/1981 | Sabia | 174/23 |
| 4,331,379 | 5/1982 | Oestreich et al. | 350/96.23 |

FOREIGN PATENT DOCUMENTS

| | | | |
|---|---|---|---|
| 2845887 | 4/1980 | Fed. Rep. of Germany | 264/1.5 |
| 1445732 | 8/1976 | United Kingdom | 350/96.23 |
| 1526777 | 9/1978 | United Kingdom | 264/1.5 |
| 2046471 | 11/1980 | United Kingdom | 350/96.32 |

*Primary Examiner*—James Lowe
*Attorney, Agent, or Firm*—Buell, Ziesenheim, Beck & Alstadt

[57] ABSTRACT

In the manufacture of an optical cable element comprising a tube of plastics material loosely housing at least one optical fibre, a water-impermeable medium in a liquid or semi-liquid state is applied to an advancing optical fibre immediately upstream of an extruder in such a way and under such a pressure that the advancing optical fibre with water-impermeable medium therearound passes into the extruder. After a tube of polymeric material has been extruded around the advancing optical fibre and the surrounding water-impermeable medium in such a way that the internal diameter of the tube is greater than the overall diameter of the optical fibre and the extruded tube has been drawn down and so treated that the molecules are longitudinally oriented, the space in the tube not occupied by the optical fibre is filled with water-impermeable medium of a jelly-like nature.

19 Claims, 1 Drawing Figure

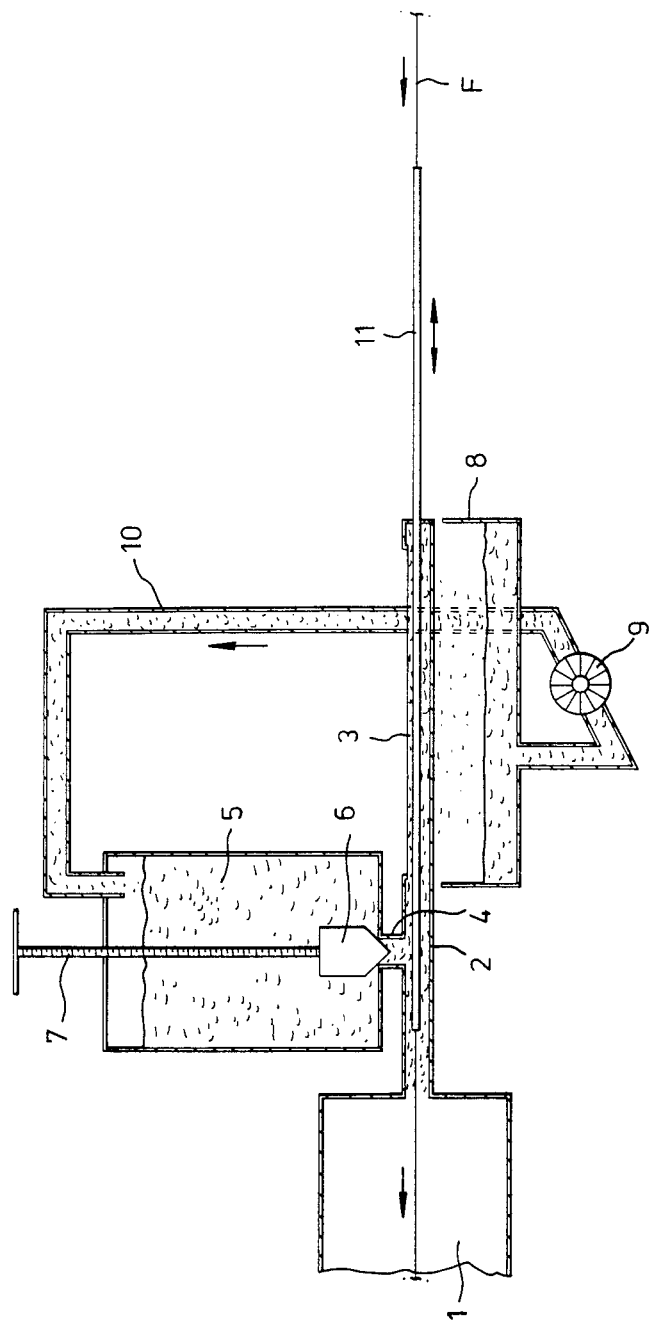

OPTICAL CABLE ELEMENT MANUFACTURE

This application is a continuation of my copending application Ser. No. 307,072, filed Sept. 30, 1981, now abandoned.

Light, which term includes the ultra-violet, visible and infra-red regions of the electromagnetic spectrum, is transmitted in an optical transmission system by means of optical guides in the form of cables including one or more than one optical fibre.

One form of optical cable which is especially, but not exclusively, suitable for use in the communications field for transmission of light having a wavelength within the range of 0.8 to 1.9 micrometers includes a plurality of optical cable elements each comprising a separately formed tube of rubber or plastics material in which is or are loosely housed at least one separate optical fibre and/or at least one optical bundle comprising a group of optical fibres or a group of fibres including at least one optical fibre and at least one non-optical reinforcing fibre or other reinforcing elongate member.

Optical cable elements as above described will hereinafter be referred to as "of the kind specified".

When optical cable elements of the kind specified are used in a wet and/or sub-zero environment, the possibility of entry of water into the space bounded by the tube of an optical cable element exists, either by permeation through the material of the tube itself or by flow into an open end of the tube. Subsequent freezing of this water can lead to ice crystals pressing upon the or each fibre and consequential raising of the optical attentuation of any signal being transmitted along the fibre; the very presence of water in contact with an optical fibre can also weaken the fibre mechanically. With a view to reducing substantially the risk that water will enter the space bounded by the tube of an optical cable element of the kind specified, it has been proposed to fill that part of the space not occupied by an optical fibre(s) and/or optical bundle(s) with a water-impermeable medium of a grease-like nature.

The present invention provides an improved method of manufacturing an optical cable element of the kind specified having a water-impermeable medium of a jelly-like nature as hereinafter defined, filling the space in the tube of the optical cable element not occupied by the optical fibre(s) and/or optical bundle(s).

According to the invention, the method comprises causing at least one separate optical fibre and/or at least one optical bundle to travel in a rectilinear direction in the direction of its length under a controlled tension; applying to the advancing optical fibre and/or optical bundle immediately upstream of extrusion apparatus a water-impermeable medium in a liquid or semi-liquid state in such a way and under such a pressure that the advancing optical fibre and/or optical bundle with water-impermeable medium therearound passes into the extrusion apparatus; extruding a tube of polymeric material around the advancing optical fibre and/or optical bundle and the surrounding water-impermeable medium in such a way that the internal diameter of the tube is substantially greater than the overall diameter of the optical fibre and/or optical bundle; drawing down the extruded tube of polymericmaterial to reduce its internal diameter to such an extent that the tube loosely envelops the optical fibre and/or optical bundle with the space within the tube not occupied by the optical fibre and/or optical bundle substantially filled with water-impermeable medium of a jelly-like nature and heating the extruded tube as it is being drawn down; and annealing the drawn-down tube to reduce the risk of subsequent substantial shrinkage of the tube.

By a "water-impermeable medium of a jelly-like nature" is meant a medium which, at the normal operating temperature of a cable of which the optical cable element forms a component part, will deform in an elastic manner and which, if subjected to sufficient pressure, will flow.

Preferably, water-impermeable medium in a liquid state is applied to the advancing optical fibre and/or optical bundle immediately upstream of the extrusion apparatus by causing the advancing optical fibre and/or optical bundle to pass into a chamber which is connected to the upstream end of the extrusion apparatus and which contains water-impermeable medium in a liquid state and at a substantially constant pressure head. The chamber is preferably of substantially elongate form and, over a part of its length remote from the extrusion apparatus, is open at the top so that water-impermeable medium being introduced into the chamber can flow out of the chamber into a reservoir positioned beneath the chamber. Water-impermeable medium in a liquid state is preferably introduced, from a storage tank in which water-impermeable medium is maintained at a substantially constant temperature by heating means, into the chamber through at least one port in its wall, rate of flow of water-impermeable medium from the storage tank into the chamber being manually or automatically controlled. Preferably, the storage tank, chamber and reservoir positioned beneath the chamber form part of a circulatory system, water-impermeable medium collected in the reservoir from the chamber being pumped back into the storage tank. The reservoir may be heated to maintain the water-impermeable medium in a liquid state.

To facilitate initial threading of an optical fibre and/or optical bundle through the chamber and into the extrusion apparatus, preferably a substantially rigid capillary tube extends through the chamber and into the extrusion apparatus and is longitudinally movable with respect to the chamber and extrusion apparatus. Initially, the optical fibre and/or optical bundle is threaded through the capillary tube and through the extrusion apparatus. When manufacture of an optical cable element of the kind specified has commenced and water-impermeable medium in a liquid state is being introduced at the required rate and pressure into the chamber, the capillary tube is gradually withdrawn from the extrusion apparatus and chamber in an upstream direction so that water-impermeable medium is applied directly to the optical fibre and/or optical bundle being drawn through the chamber.

It will be appreciated that the water-impermeable medium must be a compound that will be fluid and of a low viscosity at the temperature at which the polymeric material is extruded around the advancing optical fibre and/or optical bundle, that is to say at a temperature in the range 70°–80° C., in order that the water-impermeable medium can flow into the upstream end of the extrusion apparatus under the combined action of gravity and longitudinal movement of the advancing optical fibre and/or optical bundle. In addition, preferably the water-impermeable medium will remain in a jelly-like condition within a temperature, range of −40° to +70° C. A preferred water-impermeable medium comprises a compound containing a major proportion of technical white oil and a minor proportion of a thermoplastics rubber. Preferably, the compound contains:
100 parts technical white oil having a viscosity of 14 c/s at 40° C.
3 to 5 parts ELEXAR thermoplastics rubber 8431Z, a trademarked product sold by Shell Chemical Company, Drawing down of the extruded tube of polymeric material causes the molecules of the polymeric material to line up longitudinally and such longitudinal orientation of the molecules is facilitated by heating the extruded tube as it is being drawn down, for instance by causing it to pass through an oven. The longitudinal orientation of the molecules substantially increases the strength of the tube in a longitudinal direction so that the tube affords good protection for the loosely housed optical fibre and/or optical bundle when a plurality of optical cable elements of the kind specified are being assembled together to make an optical cable or when the optical cable is being installed. Longitudinal orientation of the molecules also reduces the co-efficient of thermal expansion of the polymeric material to bring it substantially closer to that of the material of the optical fibre or fibres.

After the tube of polymeric material has been extruded and before its diameter is reduced by drawing down, the tube may be cooled by passing it through a cooling bath of water at a temperature within the range 70°–75°C. to maintain the water-impermeable medium in the tube in a liquid state.

Preferably, to ensure that the water-impermeable medium in the advancing tube is maintained in the desired liquid state throughout the manufacturing process, at any position along the line at which the tube is exposed to the atmosphere, the tube is heated. Preferably the optical fibre and/or optical bundle travels at a speed substantially the same as the final speed of the tube. Since the optical fibre and/or optical bundle is drawn into the tube by frictional forces where the tube is wound several times around the take-up drum, substantially similar speeds will be achieved if the take-up drum is chosen to be of sufficiently large diameter.

By way of example, just after extrusion of the tube of polymeric material, the tube may be moving at a speed of 4 m/min; after it has been drawn down the tube may be moving at 20 m/min; and after annealing of the tube it may be moving at 16 m/min. The advancing optical fibre and/or optical bundle will be moving at 16 m/min throughout the manufacturing process. Since the bulk of the water-impermeable medium in the tube moves at the speed of the tube, the optical fibre and/or optical bundle loosely housed in the tube is subjected to considerable shear forces and these must be maintained at a low value by use of a compound of low viscosity, e.g. 20 c/s, at the line temperature.

Preferably the tube is drawn from the extruder and through the cooling and heating means by at least two endless belt haul-off devices which determine the linear speeds of the tube and hence draw it down to the desired cross-sectional size. The control circuit of the drive means for the first endless belt haul-off device may be linked with the output of a diameter gauge, e.g. an optical diameter gauge, to give automatic control of the speed of the extruder screw. A third endless belt haul-off device is preferably employed downstream of the final cooling bath for controlling the degree of contraction resulting from the annealing process.

One or each, but not the last, of the endless belt haul-off devices may be heated to assist in ensuring that the water-impermeable medium in the advancing tube is maintained in the desired liquid state throughout the manufacturing process.

The invention also includes apparatus for use in the manufacture of an optical cable element of the kind specified by the method as hereinbefore described.

The invention further includes an optical cable element of the kind specified when manufactured by the method as hereinbefore described.

The invention is further illustrated by a description, by way of example, of preferred apparatus for applying a water-impermeable medium in a liquid state to an advancing optical fibre in the manufacture of an optical cable element of the kind specified, with reference to the accompanying diagrammatic drawing which shows a sectional side view of the apparatus.

The single accompanying figure is a diagrammatic sectional side view of an apparatus for carrying out this invention.

Referring to the drawing, the apparatus comprises extrusion apparatus 1 to the upstream end of which is connected an elongate tubular chamber 2 which, over a part 3 of its length remote from the extrusion apparatus, is open at the top. Connected to a port 4 in the wall of the elongate chamber 2, is an electrically heated storage tank 5 in which water-impermeable medium is maintained in a liquid state.

The water-impermeable medium comprises a compound containing:
100 parts technical white oil WOT 14 ex Burmah Castrol
4 parts shell ELEXAR thermoplastics rubber 8431Z.
The rate of flow water-impermeable medium in the storage tank 5 is controlled manually by a stopper 6 of polytetrafuoroethylene which can be inserted into the port 4 by means of a manually controlled threaded shaft 7.

Positioned beneath the part 3 of the elongate chamber 2 open at the top, is a reservoir 8 which is connected through a pump 9 and via a pipe 10 back into the top of the storage tank 5. Slidably mounted in the elongate chamber 2 is a stainless steel capillary tube 11 for use in initially threading an optical fibre F through the chamber, when the chamber is filled with water-impermeable medium, and into and through the extrusion apparatus. It will be appreciated that since the elongate chamber 2 is open at the top along a substantial part 3 of its length the water-impermeable medium being fed into the chamber through the port 4 will be maintained at a substantially constant pressure head since excess water-impermeable medium will flow out of the chamber and into the reservoir 8.

What I claim as my invention is:

1. A method of manufacturing an optical cable element comprising a tube of plastics material loosely housing at least one optical fibre, the space in the tube not occupied by the optical fibre or fibres being filled with a water-impermeable medium of a jelly-like nature, which method comprises initially causing at least one optical fibre to travel in a rectilinear direction in the direction of its length under a controlled tension through a substantially rigid capillary tube which extends through a chamber connected to the upstream end of extrusion apparatus and into said extrusion apparatus; introducing water-impermeable medium in a liquid state into said chamber at a substantially constant pressure head; gradually withdrawing the capillary tube from the extrusion apparatus and chamber in an upstream direction so that water-impermeable medium is applied directly to the optical fibre being withdrawn through the chamber and that the advancing optical fibre with water-impermeable medium therearound passes directly from the chamber into the extrusion apparatus; extruding a tube of polymeric material around the advancing optical fibre and the surrounding water-impermeable medium in such a way that the internal diameter of the tube is substantially greater than the overall diameter of the optical fibre; drawing down the extruded tube of polymeric material to reduce its internal diameter to such an extent that the tube loosely envelopes the optical fibre with the space within the tube not occupied by the optical fibre substantially filled with water-impermeable medium of jelly-like nature and heating the extruded tube as it is being drawn down; and annealing the drawn-down tube to reduce the risk of subsequent substantial shrinkage of the tube.

2. A method as claimed in claim 1, wherein the chamber is of substantially elongate form and, over a part of its length remote from the extrusion apparatus, is open at the top so that water-impermeable medium being introduced into the chamber flows out of the chamber into a reservoir positioned beneath the chamber.

3. A method as claimed in claim 2, wherein water-impermeable medium in a liquid state is introduced, from a storage tank in which water-impermeable medium is maintained at a substantially constant temperature by heating means, into the chamber through at least one port in its wall, rate of flow of water-impermeable medium from the storage tank into the chamber being controlled.

4. A method as claimed in claim 3, wherein the storage tank, chamber and reservoir positioned beneath the chamber form part of a circulatory system, water-impermeable medium collected in the reservoir from the chamber being pumped back into the storage tank.

5. A method as claimed in claim 2, wherein the reservoir is heated to maintain the water-impermeable medium in a liquid state.

6. A method as claimed in claim 1, wherein the water-impermeable medium remains in a jelly-like condition within a temperature range of $-40°$ to $+70°$ C.

7. A method as claimed in claim 1, wherein, after the tube of polymeric material has been extruded and before its diameter is reduced by drawing down, the tube is cooled by passing it through a cooling bath of water at a temperature within the range 70 to $75°$ C. to maintain the water-impermeable medium in the tube in a liquid state.

8. A method as claimed in claim 1, wherein, at any position along the line at which the tube is exposed to the atmosphere, the tube is heated.

9. A method as claimed in claim 1, wherein at least two longitudinally spaced endless belt haul-off devices determine the linear speed of the tube and hence draw it down to the desired cross-sectional size.

10. A method as claimed in claim 9, wherein an endless belt haul-off device is employed downstream of the final cooling bath for controlling the degree of contraction resulting from the annealing process.

11. A method as claimed in claim 9, wherein at least one, but not the last, of the endless belt haul-off devices is heated to assist in ensuring that the water-impermeable medium in the advancing tube is maintained in the desired liquid state throughout the manufacturing process.

12. A method as claimed in claim 1, wherein the tube is wound several times around a take-up drum of such a diameter that the optical fibre is drawn into the tube by frictional forces and the speeds of the tube and the optical fibre are substantially the same.

13. A method as claimed in claim 1, wherein the water-impermeable medium comprises a compound containing a major proportion of technical white oil and a minor proportion of a thermoplastics rubber.

14. Apparatus for use in the manufacture of an optical cable element, which apparatus comprises apparatus for extruding a tube of polymeric material; a chamber which is connected to the upstream end of the extrusion apparatus and which contains water-impermeable medium in a liquid state and at a substantially constant pressure head; a substantially rigid capillary tube which extends through the chamber and into the extrusion apparatus and which is longitudinally moveable with respect to the chamber and extrusion apparatus; means for causing at least one optical fibre to travel in a rectilinear direction in the direction of its length under a controlled tension through said capillary tube and into said extrusion apparatus; means for withdrawing the capillary tube in an upstream direction so that the advancing optical fibre with water-impermeable medium therearound will pass directly from said chamber into the extrusion apparatus; means, downstream of the extrusion apparatus, for drawing down an extruded tube of polymeric material to reduce its internal diameter to such an extent that the tube will loosely envelop an optical fibre with the space within the tube not occupied by the optical fibre substantially filled with water-impermeable medium of a jelly-like nature and means for heating the extruded tube; and means for annealing the drawn-down tube to reduce the risk of subsequent substantial shrinkage of the tube.

15. Apparatus as claimed in claim 14, wherein the chamber is of substantially elongate form and, over a part of its length remote from the extrusion apparatus, is open at the top and wherein a reservoir is positioned beneath the chamber so that water-impermeable medium being introduced into the chamber can flow out of the chamber into the reservoir.

16. Apparatus as claimed in claim 15, wherein a storage tank having an associated heating means by which water-impermeable medium in the tank is maintained at a substantially constant temperature is connected to at least one port in the wall of the chamber.

17. Apparatus as claimed in claim 16, wherein the storage tank, chamber and reservoir form part of a circulatory system, a pump being associated with the reservoir for pumping water-impermeable medium collected in the reservoir from the chamber back into the storage tank.

18. Apparatus as claimed in claim 17, wherein heating means is associated with the reservoir for maintaining water-impermeable medium in the reservoir in a liquid state.

19. Apparatus as claimed in claim 14, wherein the means for causing an optical fibre to travel in the direction of its length under a controlled tension comprises at least two longitudinally spaced endless belt haul-off devices, at least one, but not the last, of the endless belt haul-off devices having associated means for heating the device.

* * * * *

UNITED STATES PATENT AND TRADEMARK OFFICE
CERTIFICATE OF CORRECTION

PATENT NO. : 4,554,116

DATED : November 19, 1985

INVENTOR(S) : EDWARD I. COOKE

It is certified that error appears in the above-identified patent and that said Letters Patent is hereby corrected as shown below:

Column 2, line 66, after temperature, delete ",".

Column 5, line 4, change "withdrawn" to --drawn--.

Column 5, line 17, after of, insert --a--.

Signed and Sealed this

Third Day of June 1986

[SEAL]

Attest:

DONALD J. QUIGG

Attesting Officer

Commissioner of Patents and Trademarks